Figure 3:
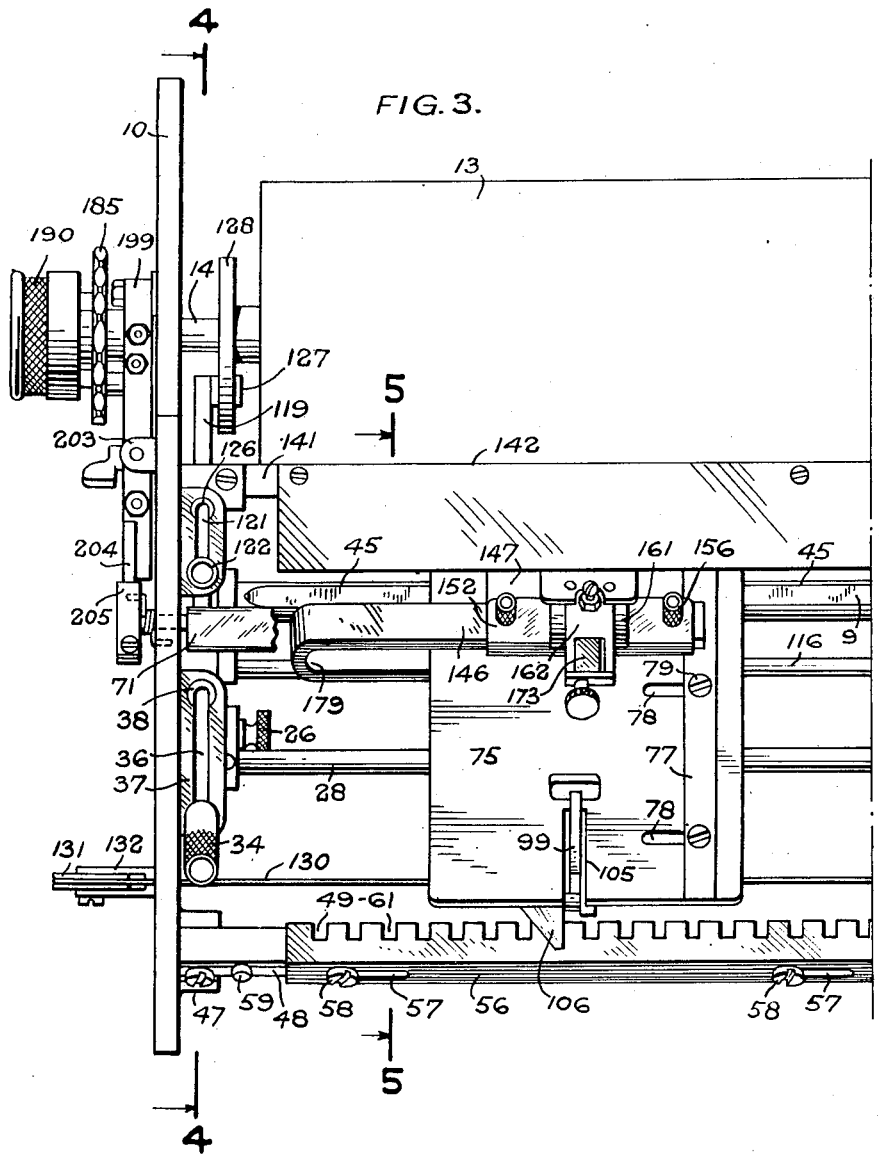

March 18, 1952     R. M. FORD     2,589,790
SECONDARY FEED AND MOISTENING DEVICE FOR
HECTOGRAPH DUPLICATING MACHINES
Original Filed Aug. 6, 1947     7 Sheets-Sheet 1
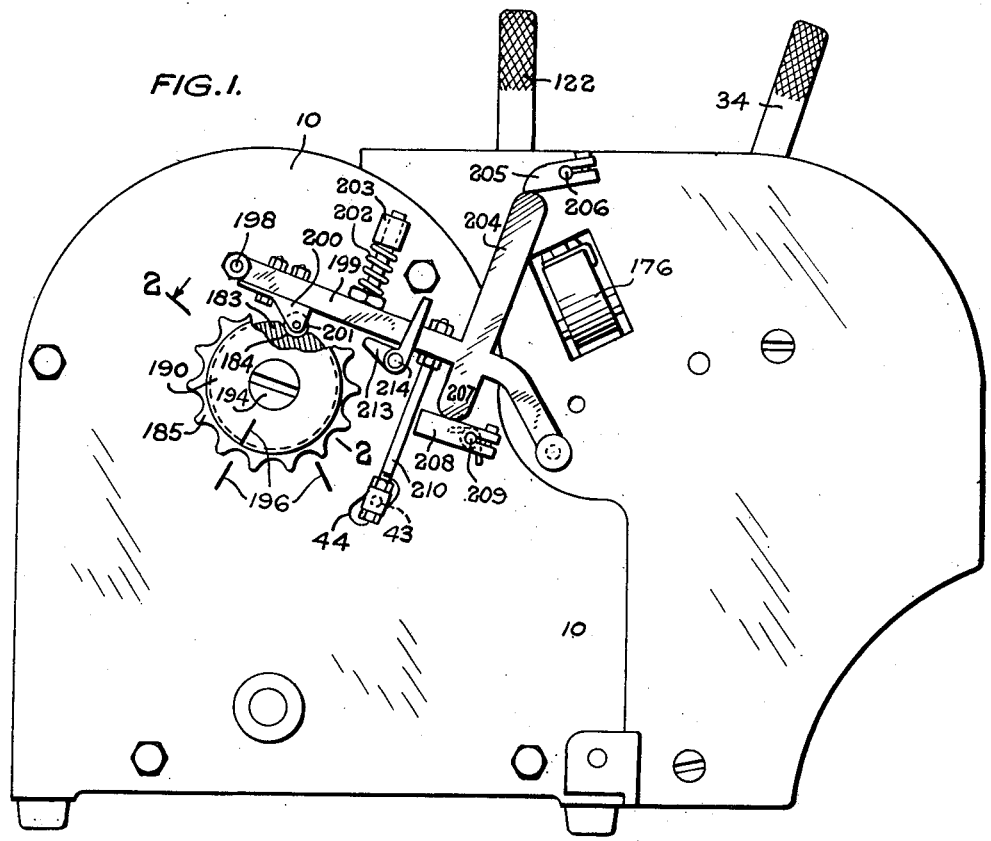
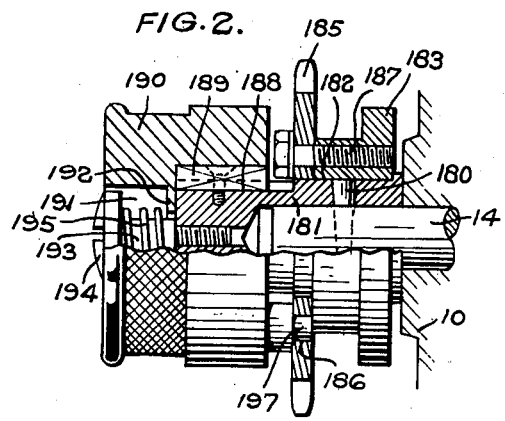
INVENTOR:
Ronald Max Ford
By Richardson, David and Nedom
Atty's March 18, 1952 R. M. FORD 2,589,790
SECONDARY FEED AND MOISTENING DEVICE FOR
HECTOGRAPH DUPLICATING MACHINES
Original Filed Aug. 6, 1947 7 Sheets-Sheet 2

INVENTOR:
Ronald Max Ford
By Richardson, David and Nordon
ATTY'S

March 18, 1952 R. M. FORD 2,589,790
SECONDARY FEED AND MOISTENING DEVICE FOR
HECTOGRAPH DUPLICATING MACHINES
Original Filed Aug. 6, 1947 7 Sheets-Sheet 3
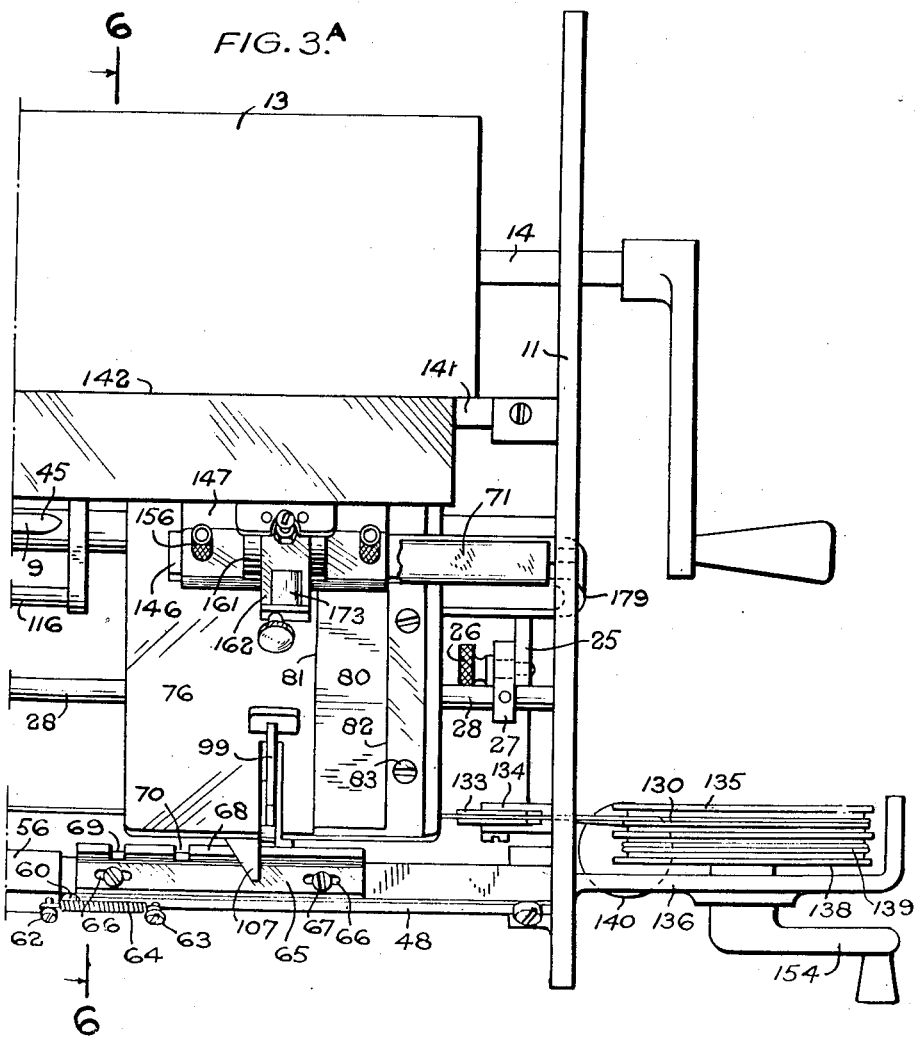
INVENTOR:
Ronald Max Ford
By Richardson, David and Vordon
Att'ys

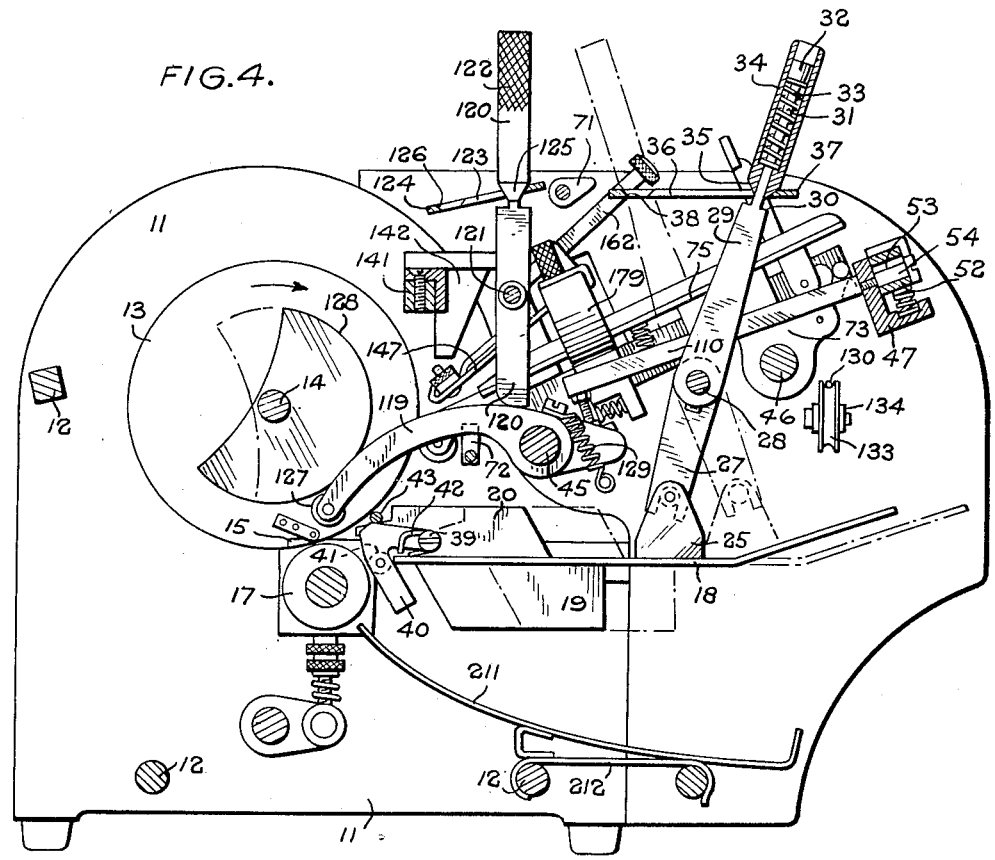

March 18, 1952  R. M. FORD  2,589,790
SECONDARY FEED AND MOISTENING DEVICE FOR
HECTOGRAPH DUPLICATING MACHINES
Original Filed Aug. 6, 1947                                   7 Sheets-Sheet 6

INVENTOR:
Ronald Max Ford
By Richardson, David and Vardon
Attys

March 18, 1952 — R. M. FORD — 2,589,790
SECONDARY FEED AND MOISTENING DEVICE FOR
HECTOGRAPH DUPLICATING MACHINES
Original Filed Aug. 6, 1947 — 7 Sheets-Sheet 7
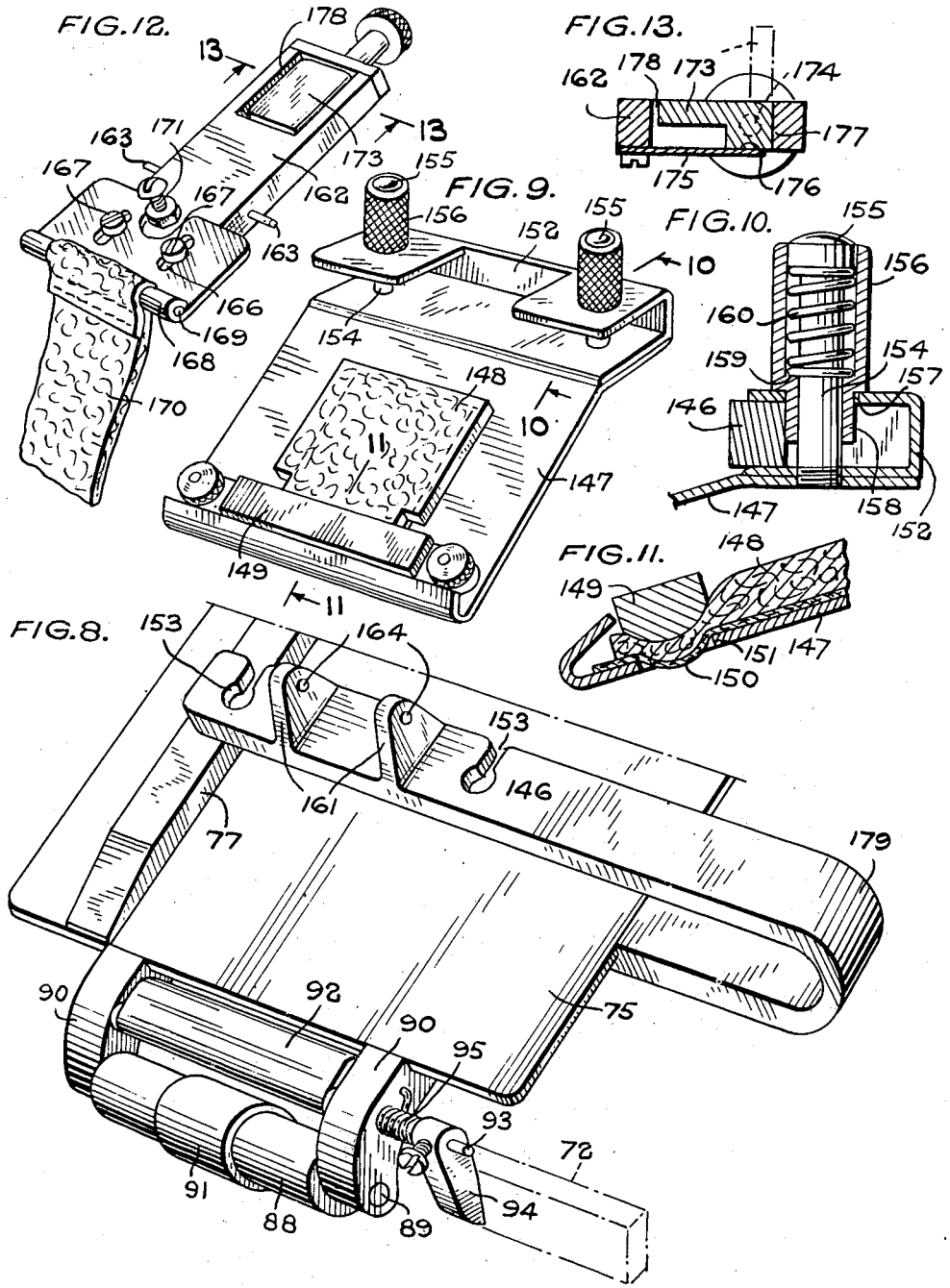
INVENTOR:
Ronald Max Ford
by Richardson, David and Verdon
Attys Patented Mar. 18, 1952

2,589,790

UNITED STATES PATENT OFFICE 2,589,790

SECONDARY FEED AND MOISTENING DEVICE FOR HECTOGRAPH DUPLICATING MACHINES

Ronald Max Ford, Sparkbrook, Birmingham, England

Original application August 6, 1947, Serial No. 766,797. Divided and this application July 9, 1949, Serial No. 103,933. In Great Britain August 14, 1946

8 Claims. (Cl. 101—132.5)

This invention relates to duplicating machines of the kind having a frame in which is mounted a cylinder to which is secured a master sheet having the matter to be reproduced in reverse, the machine also comprising moistening means for the copy sheets, a feed tray for the copy sheets and a pressure roller to press the moistened copy sheets into contact with the master when the cylinder is revolved, being a divisional on application Serial No. 766,797, filed August 6, 1947.

In such machines it is usual to attach the master to the cylinder by means of a clip on the cylinder, and it is necessary at starting that this clip shall occupy a definite position in relation to the line of contact between the cylinder and the pressure roller. For this reason it is usual to provide what are generally known as registration means to bring the cylinder to rest temporarily when the master sheet clip is in the correct position for feeding-in the copy sheet. Such registration means usually take the form of a spring-loaded lever having a tooth which drops into engagement with a notch in the periphery of a flange rotating with the cylinder.

It is known in connection with such machines to provide for sheet reproduction, i. e. for reproducing the full width of the sheet on the master. It is also known to provide a master which, when secured on the cylinder, has its lines running circumferentially, and in connection with these machines it is known to provide the machine with a plurality of feed-in trays each of a width considerably less than the length of the cylinder and to provide for the adjustment of these feed-in trays parallel to the length of the cylinder so that portions of the matter on the master sheet can be reproduced.

The object of the present invention is to provide an improved construction of machine.

According to the present invention the machine comprises a frame, a cylinder, a main pressure roller, a main moistener and a main feed tray all for copy sheets for sheet reproduction, a guide bar parallel to the cylinder, a pair of spaced brackets slidably mounted on the guide bar, means for retaining each of these brackets in various positions along the bar, a secondary feed tray on each of these brackets for copy sheets used for sectional reproduction, a secondary moistener having a moistening strip extending parallel to the guide bar and for the major part of the length of the cylinder, a moistening plate associated with each of the secondary feed trays, each of said moistening plates having absorbent means for engaging the sectional copy sheets fed over the secondary trays, and a liquid transfer member movable with each of the secondary feed trays, said liquid transfer members being constantly in contact with the absorbent means on the moistening plate and being moved into contact with the secondary moistener during the operation of the machine, and out of contact therewith when the machine is in the registration position.

The machine may be provided with two cam bars extending for the major part of the length of the cylinder, these cam bars each being pivoted to the frame on an axis parallel to the axis of the cylinder, one of these cam bars operating to actuate the liquid transfer members associated with the secondary feed trays and the other operating to actuate the moistening bars on the secondary feed trays for pressing the copy sheets into engagement with the moistening means on the moistening plates, both of these cams being in inoperative position during registration periods of the machine, and being automatically moved into operative positions when the cylinder is operated.

Each of the secondary feed trays is provided with its own pressure roller which can be brought in and out of contact with the cylinder as required for use, i. e. these pressure rollers being moved into contact with the cylinder when the particular secondary feed tray is in operation and being moved out of contact with the cylinder when the secondary feed tray carrying the moistening roller is out of operation.

The machine may be driven by power or by hand, and in either case, for providing for two registration positions of the cylinder, the cylinder shaft may have fixed to it a driving disc having two driving dogs or portions angularly spaced and adapted to be engaged alternatively by driving means on a loose flange on the shaft axially movable thereon, this flange having a notch in its periphery for engagement by the tooth on the usual spring-loaded registration lever. Spring-loaded means may be provided for keeping the driving members or portions of the driving disc and loose flange in engagement, and this can be moved by hand into the released position to permit the cylinder to be turned from one registration position to the other.

The spring-loaded registration lever may be provided with two arms for operating the two cam bars, one of which actuates the moistening bars on the secondary trays and the other of which actuates the liquid transfer members. An operating lever may be provided pivoted to the frame of the machine for moving the spring-loaded registration lever into a released position and holding it there when it is desired to use the machine for work of greater length than the circumference of the cylinder.

When the secondary trays have been moved parallel to the axis of the cylinder into the required position each is locked against further movement in this direction by a movable locking member, and the movement of this locking member into the locked position automatically moves the tray to bring its pressure roller into pressure contact with the cylinder. When the movable locking member is moved into the released position the tray is automatically moved again in a manner to bring its pressure roller out of contact with the cylinder.

Figure 5:
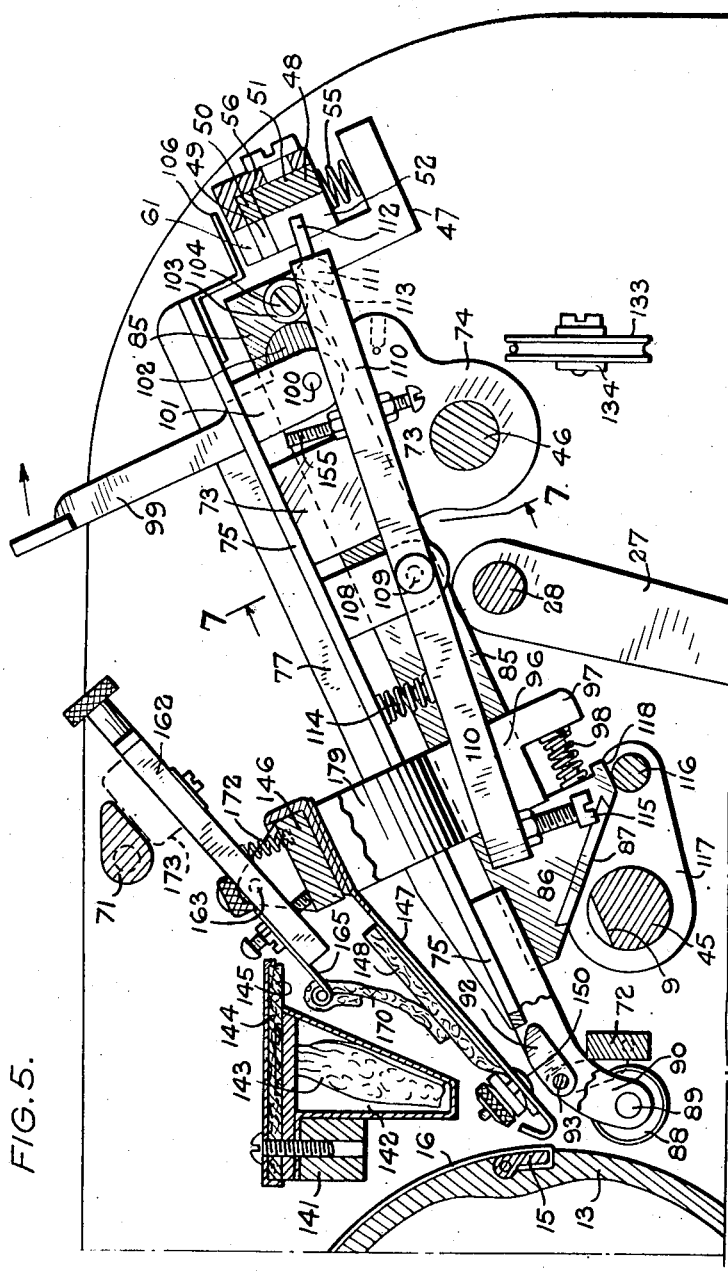
Figure 6:
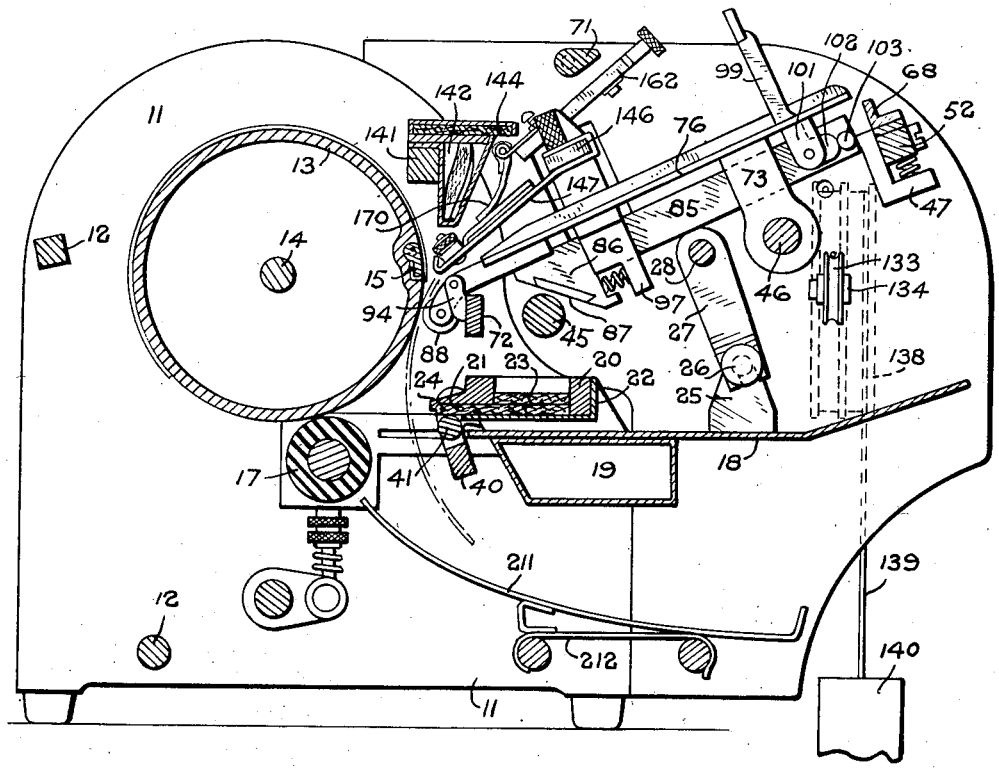
Figure 7:
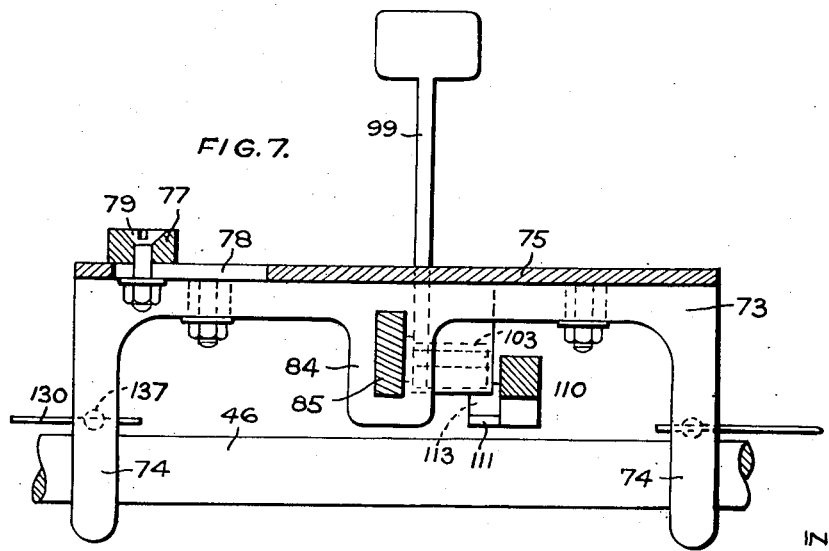

Refering to the drawings:

Figure 1 is an end view of the machine;
Figure 2 is a section on line 2—2 of Figure 1;
Figure 3 is a part plan view;
Figure 3A is a part plan view;
Figure 4 is a section on line 4—4 of Figure 3;
Figure 5 is a section on line 5—5 of Figure 3;
Figure 6 is a section on line 6—6 of Figure 3A;
Figure 7 is a section on line 7—7 of Figure 5;
Figure 8 is a perspective view showing the forward portion of one of the secondary trays;
Figure 9 is a perspective view showing a part of the secondary tray and moistener;
Figure 10 is a section on line 10—10 of Figure 9;
Figure 11 is a section on line 11—11 of Figure 9;
Figure 12 is a perspective view showing another part of the secondary moistener; and
Figure 13 is a sectional view on line 13—13 of Figure 12.

In the construction illustrated the frame comprises a pair of side plates 10, 11, disposed in spaced relationship and connected together at suitable positions by horizontal ties 12. The cylinder 13 is mounted on a cylinder shaft 14 supported in bearings in the side plates, the cylinder being arranged horizontally and extending between the side plates. The cylinder is provided with a pivoted clip 15 for holding the leading edge of the master sheet 16, and under the cylinder and parallel to it is the usual pressure roller 17 to press the copy sheets against the master sheet on the cylinder.

The main feed tray 18 is provided for the copy sheets used for sheet reproduction, and this tray may be arranged horizontally and placed at a relatively low level so that the copy sheets are fed under the cylinder and over the main pressure roller.

Mounted on the main feed tray 18 is a moistening device incorporating a receptacle 19 for moistening liquid below the tray and a body 20 above the tray, this body carrying an absorbent member 21 held in place by a plate 22. The liquid is conveyed from the receptacle 19 to the absorbent member 21 by means of one or more wicks 23. A portion 24 of the lower side of the absorbent member is exposed and the copy sheets which are passed over the tray can be moved into contact with the surface 24 as they pass to the cylinder.

At its ends the tray 18 is provided with lugs 25 in which are screws 26 engaged by the lower forked ends of levers 27 fixed on a cross shaft 28 supported in the side frames of the machine. Also fixed on the shaft 28 is an operating lever 29 which is shouldered at 30 and provided with a stem 31 having a head 32 under which is a spring 33 operating in a sleeve 34 which forms a handle. The lower end 35 of the sleeve is of conical form and engages in a slot 36 in a plate 37 secured to one of the side frames. Each end of the slot 36 is provided with a countersunk portion 38 into which the part 35 of the sleeve 34 can enter. The shaft 28 can be rocked by the lever 29 to move the main tray 18 either into the position shown in Figure 4 which is the working position, or into the position shown in Figure 6 which is the withdrawn position.

Pivoted to each end of the body of the moistener at 39 is a lever 40, and carried by these two levers is a moistening roller 41. The levers 40 are acted upon by springs 42 tending to raise the levers and to cause the roller 41 to move into contact with the surface 24 of the absorbent member.

When the tray 18 is in the position shown in Figure 4 and the machine is in the registration position the levers 40 are held in a lowered position by a pin 43 projecting through an opening 44 in the side plate 10, but when the cylinder leaves the registration position the pin 43 is raised by means hereinafter described to allow the roller 41 to move upwardly and to press the copy sheets against the surface 24.

The side plates 10 and 11 are extended forwardly to provide supports for two spaced horizontal bars 45, 46, which may be of circular section, and the side plates of the frame are also provided with lugs 47 to which are attached a horizontal bar 48 which is provided with spaced notches 49 along its inner edge.

The bar 48 may be made of two strips of metal, an upper strip 50 which has the notches 49, and a flat strip 51. These strips are secured together at right angles to each other, and at the ends of the bar blocks 52 are secured in the angle between the two strips. These blocks are provided with vertical slots 53 through which pass screws 54 screwing into the lugs 47. Compression springs 55 act between the lower side of the bar 48 and the lugs 47 so that the bar 48 is permitted an up and down movement.

Mounted on the bar 48 is an angle plate 56. This angle plate is provided with longitudinal slots 57 through which pass screws 58 by which the bar 56 is retained on the bar 48 in a manner which permits it to slide in an endwise direction. The sliding movement of the bar 56 is limited by stops 59, 60 attached to the bar 48, the extent of the movement permitted being equal to the pitch of the notches 49. The upper flange of the sliding bar 56 is provided with notches 61 which are of the same size and the same pitch as the notches 49.

Near one end the sliding bar 56 is provided with a screw 62, and in a suitable position the bar 48 is provided with a screw 63. These two screws are connected by a tension spring 64 so that if the sliding bar 56 is moved to the left, as shown in Figure 3 and 3A, and then released it moves through a distance equal to the pitch of the notches and when released returns automatically to its original position.

The bar 48 near one end is further provided with an angle-section plate 65. This plate is provided with slots 66 and is attached to the bar 48 by screws 67 passing through these slots so that the bar 65 can be adjusted in an endwise direction and then fixed by the screws 67. The bar 65 incorporates a flange 68 provided with spaced notches 69, 70.

Two cam bars 71, 72 are provided each having trunnions at its ends engaging the side plates, these cam bars extending parallel to the cylinder and each being pivoted upon a horizontal axis.

Pivotally mounted upon the forward horizontal bar 46 are two spaced brackets 73, each of these brackets having two downwardly-extending arms 74 which are mounted on the bar, and secured to the upper sides of these brackets are the secondary trays 75, 76 for feeding-in the secondary copy sheets.

Two secondary trays are provided, one 76 being used for making copies of a heading and material stated on the master and the other 75 being used for making copies of one or more lines on the master which is fixed to the cylinder with its lines arranged circumferentially.

The upper side of the secondary tray 75 is provided with a fence 77. The tray is slotted, as shown at 78, and the fence is attached by screws 79 so that it can be adjusted in a direction parallel to the axis of the cylinder. The secondary tray 76 is provided with a fence 80 having two guiding shoulders 81 and 82. This fence is attached to the tray by screws 83.

On the lower side of each of the brackets 73 supporting a secondary tray is a central lug 84 in which is an opening forming a guide for a slide 85, this slide being mounted for movement at right angles to the axis of the cylinder. At one end the slide is provided with a nose 86 having on its lower side an incline 87 which is adapted, when the slide is advanced, to engage the bar 45, the arrangement being such that when the slide is moved forwardly the incline engages this bar 45 and causes the bracket 73 carrying the tray to move pivotally on the bar 46 so that the forward end of the tray which carries a pressure roller 88 is moved upwardly until the pressure roller engages the cylinder. Rearward movement of the slide causes the tray to pivot in the opposite direction, causing its forward end to move downwardly so that the pressure roller on the tray moves away from the cylinder. Each of the pressure rollers 88 is mounted on a pin 89 fixed in brackets 90 secured to the tray. Further, each of the pressure rollers 88 is provided with a sleeve or flange 91 of a length equal to the width of the item on the master sheet which it is desired to reproduce on the small cards or copy sheets which are passed over the secondary tray.

Pivotally mounted between the brackets 90 to the rear of the pressure roller 88 is a moistening bar 92. These moistening bars, one for each secondary tray, are each fixed upon a horizontal pin 93, to one end of which is fixed a lever 94 which is engaged by the cam bar 72 carried by the frame, the arrangement being such that when the cylinder is moved out of the registration position the said cam bar 72 is turned and rocks the moistening bar 92 on each tray so as to press the small copy sheets upwardly against a moistening appliance carried by the tray. Each of the pins 93 is acted upon by a torsion spring 95 keeping the lever 94 in contact with the cam bar 72.

The underside of each secondary tray is provided with a bracket 96 forming a second guide for the slide 85, and each of these brackets 96 is provided with a projection 97 between which and the rear side of the nose 86 operates a compression spring 98 tending to move the slide forwardly.

Each said slide 85 is adapted to be operated by a lever 99 pivoted at 100 to a block 101 on the tray, the said lever being provided with an arm 102 acting upon a roller 103 mounted on a horizontal pin 104 at the rear part of the slide. The trays 75, 76 are slotted at 105 to allow clearance for the levers 99.

Each lever 99 has two positions, between which is a dead-centre position. In one position with the lever raised the slide is moved forwardly and the tray is moved pivotally on the bar 46 into a position to bring the pressure roller 88 at the forward end of the tray away from the cylinder. The other position is reached when the tray has been moved to the required position in relation to the length of the cylinder and the lever is moved downwardly and rearwardly until, in the case of the lever 99 on the tray 76, its edge portion engages in one of the slots 69, 70 in the bar 65 carried by the bar 48. When this has been done the slide under the tray is moved rearwardly and raises the forward end of the tray until its pressure roller is in pressure contact with the cylinder. The rear edge of each secondary tray is provided with an indicating plate 106, 107 to indicate when it has been moved parallel to the axis of the cylinder into a position at which the locking lever is in line with one of the notches of the notched bar.

The lever 99 which is associated with the tray 75 does not engage with the notches of the bar 48. This tray 75 on its underside is provided with a block 108 to which is pivoted at 109 a lever 110. At its forward end this lever is provided with a tooth 112 the width of which is slightly less than the width of the notches in the bars 58 and 61. Further, at its forward end the lever 110 carries a block 111 having an inclined surface 113 which is engaged by the roller 103 when the slide 85 is moved to its forward position, thus rocking the lever 110 against the action of a compression spring 114 operating between the underside of the tray and the rear arm of the lever 110. This action brings the tooth 112 below the notches of the bars 58 and 61.

When the lever 99 associated with the tray 75 is moved forwardly and downwardly to bring the tray into the operative position the slide 85 moves forwardly and the roller 103 moves away from the surface 113 so that the forward arm of the lever 110 moves upwardly under the influence of the spring 114 until the tooth 112 engages in one of the notches in the bar 58. Further upward movement of the forward arm of the lever 110 is prevented because the rearward arm of the lever 110 is provided with an adjustable screw 115 the head of which engages a bar 116 carried by a pair of spaced levers 117 fixed on the bar 45. This bar 116 is engaged by a surface 118 on the nose 86 when the slide is in its forward position.

During normal working the bar 116 remains stationary as the levers 117 are locked against movement by fixing on the bar a lever 119 which is engaged by a lever 120 arranged transversely to it. The lever 120 is pivoted at 121 to one of the side plates and is provided with a handle 122 by which it can be rocked. This lever passes through a slot 123 in a plate 124 attached to one of the side frames of the machine. The lever 120 is provided with a conical portion 125 adapted to engage countersunk portions 126 at the ends of the slot 121, the handle 122 of the lever being constructed similarly to the handle 34 of the lever 29, i. e. it is spring-loaded and can be moved in an endwise direction to release the part 125 and thus enable the lever to be turned.

The lever 119 is provided with a roller 127 at its free end cooperating with a cam 128 on the spindle of the cylinder. The cam rotates with the cylinder, and if the lever 120 is moved into the appropriate position the lever 119 is rocked by a spring 129 and moves into a new position for a part of each revolution of the cylinder. When in this new position the bar 45 has been oscillated to bring the bar 116 away from the screw 115 so that the tooth 112 moves upwardly, leaving the notch in the bar 50 and engaging a notch in the bar 61. Also a flat 9 on the bar 45 moves opposite to the surface 87 and allows the roller 88 to drop away from the cylinder. The upward movement of the tooth 112 is limited by an adjustable stop formed by a screw 155 in the lever 110 which now comes into contact with the underside of the tray 75. When this occurs the bracket 73 carrying the tray 75 moves automatically to the left, as shown in Figures 3 and 3A, by a distance equal to the pitch of the notches. When the new position is reached the cam 128 rocks the lever 119 back into its original position and withdraws the tooth 112 from the notch in the plate 61 and engages it in a notch in the plate 50. The sliding bar 56 then moves to the right under the influence of the spring 64.

For moving the tray 75 in this way a cable 130 is provided passing over a pulley 131 on a bracket 132 carried by one of the side plates, this cable passing over a further pulley 133 on a bracket 134 on the other side plate to a winding pulley 135, the spindle of which is supported in a bracket 136 on the end plate and thence through an opening in the side plate adjacent the winding device to the position 137 on the bracket 73 carrying the tray 75. The spindle of the pulley 135 is provided with a second pulley 138 upon which is a cable 139 carrying a weight 140 to supply the power tending to move the secondary tray 75 to the left, as shown in Figure 3. This automatic step-by-step gear for moving the tray 75 can be placed out of action by turning the lever 120 into the position shown in Figure 4 and thus locking the lever 119.

A crank handle 154 may be fixed to the spindle-carrying pulleys 135 and 138, so that the cable may be moved by hand if desired.

The frame of the machine is provided with a secondary moistener and this is mounted upon a bar 141 extending horizontally between the side plates at a level adjacent the top of the cylinder. This moistener may be of any suitable construction and may include a liquid reservoir 142, suitable wicks 143 and a moistening pad 144 extending along its whole length, all these parts being enclosed except the lower surface 145 of the forward edge portion of the moistening pad, which is exposed. This moistening pad is constantly supplied with moistening liquid and is approximately as long as the cylinder.

Each of the secondary trays is provided with a horizontal arm 146 formed by the upper limb of a U-shaped member 179 secured to the tray, the arm 146 being disposed above the tray and near the secondary moistener, and mounted adjustably on this arm is a moistening plate 147. Each of these plates is provided on its upper side with a moistening pad 148 the forward portion of which is held and pressed downwardly by a bridge plate 149 and has a portion 150 projecting through an opening 151 in the underside of the moistening plate. This projecting portion 150 is of a width equal to the width of the items which are to be reproduced on the copy sheets fed over the secondary tray.

Each of the moistening plates 147 is attached to a U-shaped clip 152 which embraces one of the arms 146. Each of these arms is provided with two slots 153 of keyhole shape, and each moistening plate and clip is provided with a pin 154 having a head 155. Slidably mounted on each of the pins 154 is a sleeve 156 having a shoulder 157 and a reduced shank 158. The sleeve is further provided with an internal shoulder 159, between which and the head 155 operates a compression spring 160. The arrangement is such that the sleeves 156 can be moved upwardly on the pins 154 to bring the reduced shanks 158 out of the larger ends of the keyhole slots 153 to allow the moistening plates to be removed from the bar, and in the working position the moistening plates are locked to the bars by the sleeves 156.

Each of the arms 146 is provided with a pair of spaced lugs 161 between each pair of which is pivoted a liquid transfer member 162, which is shown in Figure 12. This liquid transfer member is provided with a cross pin 163 which engages in the holes 164 in the lugs 161 so that each liquid transfer member can pivot about the axis of the pin 163. At its forward end each of the liquid transfer members is provided with a plate 165 slotted at 166 and attached to the member 162 by screws 167 so that the plate is adjustable. The forward end of the plate is provided with spaced cylindrical portions 168 carrying a pin 169 upon which is mounted a wick or absorbent member 170. The liquid transfer member 162 is further provided with an adjustable screw 171 adapted to engage the upper side of the arm 146.

The pivoted plate 162 forming the liquid transfer member 162 is spring-loaded by a spring 172 so that normally the wick 170 carried by it is out of contact with the exposed portion 145 of the secondary moistening pad 144, but the plate 162 can be rocked, causing its forward end to make an upward movement bringing the upper end of its wick into contact with the exposed portion 145 of the moistening pad of the secondary moistener. This rocking movement is produced by the cam bar 71 carried by the frame, which cam bar is rocked when the cylinder is moved out of the registration position so that during normal working the liquid transfer member transfers liquid to the moistening pad 148 on the moistening plate. Preferably however each of the liquid transfer members is provided with a lever plate 173 adapted to be engaged by the cam bar 71, and these lever plates 173 are pivoted at 174 on a horizontal axis which is at right angles to the axis of the cylinder and acted upon by spring plates 175. These springs can act upon either of two surfaces 176, 177 to retain the lever plates either in the openings 178 in the plates 162 or projecting therefrom. During ordinary working these lever plates are raised so that the liquid transfer member will be operated during working by the cam bar 71 and will thus transfer liquid to the moistening pad on the moistening plate. If at any time the moistening pad on either of the moistening plates is getting too much moisture, the operator can turn the lever plate into a lowered position so that the liquid transfer member associated with that tray will be put out of action until the said lever plate is again raised by the operator.

Both of the secondary trays are constructed in the manner described, and each is provided with a moistening plate and a liquid transfer member.

One end of the shaft 14 to which the cylinder is fixed is brought through a bearing in the end plate 10, and fixed on this end of the shaft by a peg 180 is a sleeve 181. This sleeve is provided with a portion 182 upon which are rotatably mounted a disc 183 having the usual registration notch 184 and if required a driving disc 185, which may be in the form of a sprocket to which rotary motion may be imparted by a sprocket chain (not shown) engaging another sprocket on the shaft of an electric motor.

The disc 185 is provided with two angularly spaced holes, one of which can be seen at 186, and it is further connected to the disc 183 by one or more screws such as 187.

The sleeve 181 is provided with a groove 188 in which is fixed a key 189, and mounted on the end of the sleeve is a cap 190 having an internal keyway engaging the key 189. The end of this cap is recessed as shown at 191, and at the inner end of the recess is an inwardly-projecting flange 192 engaging the end of the sleeve. Screwing into the end of the sleeve is a screw 193 having a head 194 under which is a compression spring 195 the inner end of which bears on the flange 192. The inner end of the cap 190 is provided with a shouldered driving pin 197 which can be made to engage with either hole 186.

The purpose of this construction is to allow of an angular adjustment of the registration notch 184 in relation to the clip 15 of the cylinder, such adjustment being necessary when changing from full sheet copying on the main tray 18 to small sheet copying on either of the secondary trays 75, 76. Markings such as those shown at 196 may be provided so that when the cap 190 has been moved in an endwise direction to bring the driving pin 197 out of one of the holes 186 the operator shall be able to see when the cylinder has been turned through the necessary angle before releasing the cap 190 to allow the driving pin 197 to enter the other hole 186.

Pivotally mounted at 198 on the outer side of the end plate 10 is the registration lever 199 having a lug 200 to which is pivoted a roller 201 adapted to engage in the registration recess 184. This lever 199 is acted upon by a compression spring 202 operating against a lug 203 on the frame member 10 in such a manner to tend to move the roller 201 in the registration recess.

The lever 199 is provided with two oppositely extending arms. One of these 204 acts upon a lever 205 mounted on the pivot 206 to which the cam 71 is fixed and the other arm 207 acts upon a lever 208 fixed on the pivot 209 upon which the cam 72 is fixed. The two cam bars 71, 72 are fixed on their pivots and the pivots are acted upon by torsion springs which keep the levers 205, 208 in engagement respectively with the arms 204 and 207. Thus, when the cylinder is in the registration position both cam bars are ineffective, but the cam bars are both moved into their operative positions, one for rocking the secondary moisteners and the other for rocking the secondary moistening bars when the cylinder is out of registration.

Further, the registration lever 199 is provided with a third arm 210 which is attached to the pin 43 which is operated when the cylinder is out of registration and the main tray is in the working position to enable the moistening roller 41 associated with the main tray to press the copy sheets into engagement with the main moistener.

The machine provides means whereby on a single machine line or heading extraction may be carried out upon small copy sheets. It further provides means whereby during line extraction adjacent lines may be reproduced on successive small sheets by moving the secondary tray 75 with a step-by-step motion after each operation. Further, the machine provides means for sheet reproduction when desired.

When using the machine for line or sectional reproduction the small copy sheets are passed over one of the trays 75, 76 between the pressure roller associated with the tray and the cylinder, and then pass downwardly to a receiving tray 211 provided with a clip 212 mounted on two of the tie bars connecting the end frames 10 and 11.

The lever 213 may be pivoted at 214 to the outer side of the plate 10 for raising the registration lever 199 into an ineffective position when it is desired to use master sheets which are longer than the circumference of the cylinder.

What I claim then is:

1. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, said tray at its rearward end carrying a pressure roller for pressing the copy sheets fed over the tray against the cylinder, supporting means secured to said tray and extending above the tray, a moistener for the copy sheets on said supporting means, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

2. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guides towards and away from the master cylinder but fixed against pivotal movement in relation to the bracket, a further bracket on the underside of the tray having an opening forming a second guide for the slide, a lug on this bracket, a shoulder on the slide, a compression spring acting between said lug and said shoulder, said tray at its rearward end carrying a pressure roller for pressing the copy sheets fed over the tray against the cylinder, supporting means secured to said tray and extending above the tray, a moistener for the copy sheets on said supporting means, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

3. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, spring means urging the slide toward the cylinder, a bracket on the tray, an operating lever pivoted to said bracket, an abutment on the slide, said operating lever engaging said abutment for moving the slide forwardly, said tray at its rearward end carrying a pressure roller for pressing the copy sheets fed over the tray against the cylinder, supporting means secured to said tray and extending above the tray, a moistener for the copy sheets on said supporting means, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

4. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, spring means urging the slide towards the cylinder, a bracket on the tray, an operating lever pivoted to said bracket, an abutment on the slide, said operating lever engaging said abutment for moving the slide forwardly, means on the frame engageable by said lever when the slide is in its rearward position for locking the tray against movement parallel to the cylinder, said tray at its rearward end carrying a pressure roller for pressing the copy sheets fed over the tray against the cylinder, supporting means secured to said tray and extending above the tray, a moistener for the copy sheets on said supporting means, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

5. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, said tray at its rearward end carrying a pressure roller for pressing the copy sheets fed over the tray against the cylinder, supporting means secured to said tray and extending above the tray, a moistening plate having an opening and mounted on said supporting means, an absorbent member on said plate, means on the plate pressing a portion of the absorbent member into said opening, a moistening element carried by the frame having an absorbent member, a portion of which is exposed, a lever pivoted to the supporting means on the tray, a wick on said lever, said wick contacting the absorbent member on the plate and being moved into and out of contact with the exposed portion of the absorbent member of the moistening element, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

6. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, said tray at its rearward end carrying a pressure roller for pressing the copy sheets fed over the tray against the cylinder, supporting means secured to said tray and extending above the tray, a moistening plate having an opening and mounted on said supporting means, an absorbent member on said plate, means on the plate pressing a portion of the absorbent member into said opening, a moistening element carried by the frame having an absorbent member, a portion of which is exposed, a lever pivoted to the supporting means on the tray, a cam pivotally mounted on the frame for rocking said lever, means associated with the cylinder for operating the cam, a wick on said lever, said wick contacting the absorbent member on the plate and being moved into and out of contact with the exposed portion of the absorbent member of the moistening element, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

7. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, said tray at its rearward end carrying a pressure roller for pressing the copy sheets fed over the tray against the cylinder, supporting means secured to said tray and extending above the tray, a moistening plate having an opening and mounted on said supporting means, an absorbent member on said plate, means on the plate pressing a portion of the absorbent member into said opening, a moistening element carried by the frame having an absorbent member, a portion of which is exposed, a lever pivoted to the supporting means on the tray, a movable member on said lever, a cam pivotally mounted on the frame for engaging said movable member when in a projected position, for rocking said lever, means associated with the cylinder for operating the cam, a wick on said lever, said wick contacting the absorbent member on the plate and being moved into and out of contact with the exposed portion of the absorbent member of the moistening element, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

8. In a duplicating machine of the kind specified a frame, a rotary cylinder for holding the master sheet, a bar arranged parallel to the cylinder and mounted on the frame, a bracket pivotally mounted on the bar and movable along it, a feed tray mounted on said bracket, said bracket having an opening forming a guide, a slide mounted in said bracket beneath the feed tray and slidable through said guide towards and away from the master cylinder but fixed against pivotal movement in relation to the bracket, said tray at its rearward end carrying a pressure roller for pressing the copy sheets fed over the tray against the cylinder, a pivoted moistening member on the tray, a cam pivotally mounted on the frame for moving the moistening member pivotally, means associated with the cylinder for operating the cam, means on the tray for moving the slide towards and away from the cylinder, a second bar below the slide arranged parallel to the cylinder and mounted on the frame, and an inclined surface on the lower side of the slide adapted to engage said second bar when the slide is moved towards the cylinder so as to cause the tray to move pivotally on the bar upon which it is mounted and thus bring the pressure roller into contact with the cylinder.

RONALD MAX FORD.

REFERENCES CITED

The following references are of record in the file of this patent:

UNITED STATES PATENTS

| Number | Name | Date |
| --- | --- | --- |
| 2,286,402 | Ford | June 16, 1942 |
| 2,313,633 | Ford | Mar. 9, 1943 |
| 2,362,895 | Ford | Nov. 14, 1944 |
| 2,440,635 | Little et al. | Apr. 27, 1948 |